United States Patent [19]
Kirkpatrick

[11] Patent Number: 6,000,166
[45] Date of Patent: Dec. 14, 1999

[54] GANGED TROLLING DEVICE ADAPTED TO SUPPORT A SINGLE LURE

[76] Inventor: Gerry Kirkpatrick, 268 Huntridge Way NE, Calgary AB, Canada, T2K 4C5

[21] Appl. No.: 08/934,590

[22] Filed: Sep. 22, 1997

[51] Int. Cl.[6] .................................................. A01K 91/04
[52] U.S. Cl. ............................................................ 43/42.74
[58] Field of Search ................................. 43/42.74, 27.4, 43/43.15, 44.84

[56] References Cited

U.S. PATENT DOCUMENTS

| | | | |
|---|---|---|---|
| 1,352,979 | 9/1920 | Lawrence | 43/42.74 |
| 2,780,023 | 2/1957 | Mercier | 43/42.74 |
| 2,814,901 | 12/1957 | Suiter | 43/42.74 |
| 3,190,269 | 6/1965 | Bondi | 43/42.74 |
| 3,270,458 | 9/1966 | McAfee | 43/42.74 |
| 3,646,700 | 3/1972 | Pond | 43/42.74 |
| 4,893,432 | 1/1990 | Rosengrant | 43/42.74 |
| 4,920,687 | 5/1990 | Barnett | 43/42.74 |
| 4,998,374 | 3/1991 | Barnett | 43/42.74 |
| 5,222,317 | 6/1993 | Georgescu | 43/42.74 |

FOREIGN PATENT DOCUMENTS

| | | | |
|---|---|---|---|
| 87247 | 6/1896 | Germany | 43/42.74 |
| 62212 | 3/1940 | Norway | 43/42.74 |

*Primary Examiner*—Kurt Rowan
*Attorney, Agent, or Firm*—David S. Thompson

[57] ABSTRACT

A ganged trolling device adapted to support a single lure provides a plate body 20 defines a forward hole 22, to which is attached a trolling line and defines a rearward hole to a which a fishing line supporting a single lure or hook is attached. A center bolt 32 and a stand-off 36 support left and right pivot arms 60, 61 between two arm stops 38, 40. A number of flashers 80 are supported by the pivot arms, thereby giving the impression of a small school of fish. A single lure or hook, trailing from the plate body, in a position somewhat behind the flashers, gives the impression of a weaker fish, unable to keep up.

3 Claims, 2 Drawing Sheets

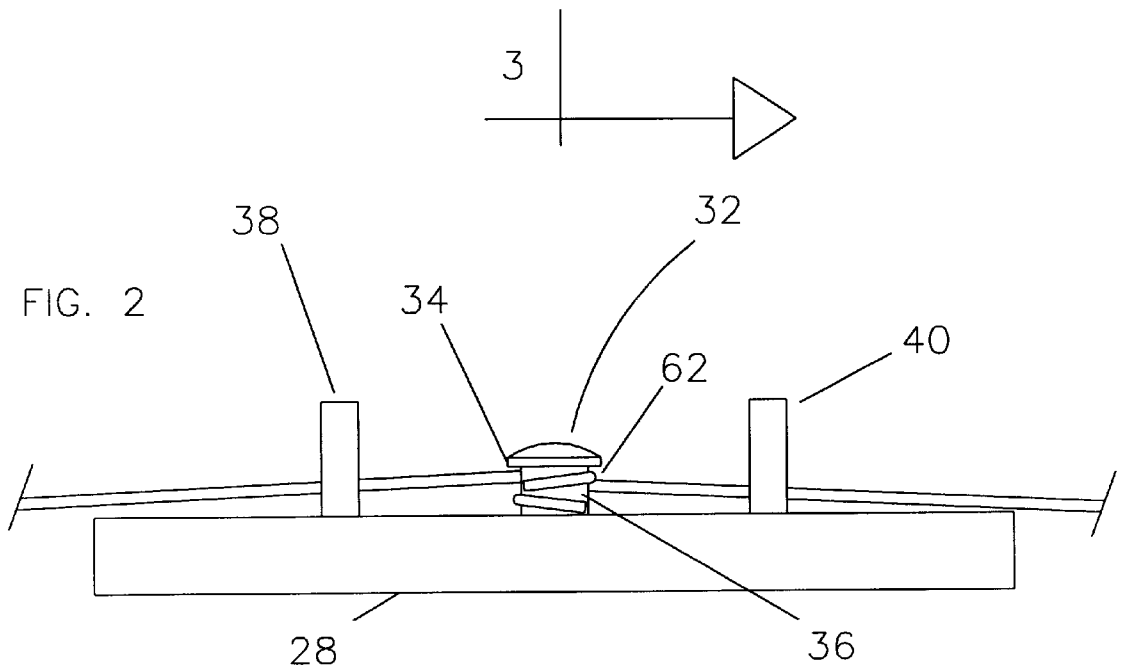
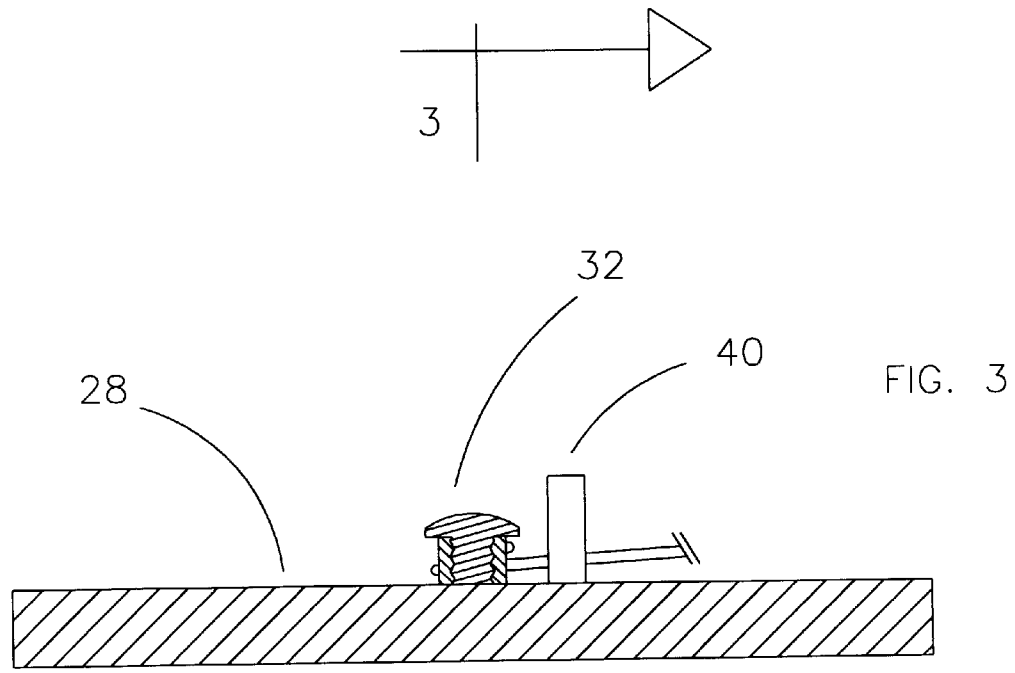

GANGED TROLLING DEVICE ADAPTED TO SUPPORT A SINGLE LURE

CROSS-REFERENCES

There are no applications related to this application filed in this or any foreign country.

BACKGROUND

A number of fishing devices known as fishing lure spreaders for use in trolling are known. Such devices allow the use of more that one baited hook, yet are controlled by a single fishing line. Most spreaders provide some type of sweep arms which extend from a planar body and support at least two fishing lures each extending from an associated flasher. It is additionally known to make the entire assembly revolve by modification to the planar body. In general, the structure of such devices tends to increase the number of fish caught by increasing the number of lures.

Unfortunately, the effectiveness of each lure is not enhanced by the lure spreader. As a result, in many fishing applications where the fish are not interested in biting, each lure is similarly unsuccessful in catching a fish.

A further problem associated with prior fishing devices having an array of flashers is that each flasher tends to move in a restricted manner, due to fishing lines, hooks and lures being trailed behind the flasher. As a result, the flasher does not move in a manner that realistically approximates the action of a small fish. This problem tends to be inherent with ganged devices, in that each flasher is associated with a hook or lure.

What is needed is a gang trolling lure combining the advantages of a single lure with the benefits of a gang type trolling device. Such a single lure would need to have a structure that resulted in a substantial increase in the attractiveness of the single lure, thereby making the lure more effective than known fishing lure spreaders having a plurality of lures.

SUMMARY

The present invention is directed to an apparatus that satisfies the above needs. A novel ganged trolling device adapted to support a single lure provides some or all of the following structures.
(A) A plate body, defining a forward fishing line attachment hole and a rearward fishing lure attachment hole. The plate body additionally includes:
 (a) A stand-off, carried by a central portion of a top face of the plate body, is internally threaded. A center bolt is threaded into the stand-off and secured by glue or similar adhesive fastener. The stand-off allows the left and right pivot arms to be supported between the head of the center bolt and the top face of the plate body.
 (b) Left and right arm stops, carried by the top face of the plate body are located on either side of the center bolt. The arm stops restrict the degree of rotation of the left and right pivot arms.
 (c) A forward clip, attached to the forward hole carries a forward swivel. The forward clip allows attachment to a fishing line connected to a fishing reel or pole.
 (d) A rearward clip, carried by the rearward hole carries a rearward swivel. The rearward clip allows attachment to a fishing line supporting a lure or hook.
(B) A left pivot arm, pivotably carried by the center bolt, defines at least one flasher attachment loop.
(C) A right pivot arm, pivotably carried by the center bolt, defines at least one attachment flasher loop.
(D) A flasher, or similar fish-attracting device, is attached to each of the at least one flasher attachment loops of the left and right pivot arms. The flashers provide the image of a small school of fish.

It is therefore a primary advantage of the present invention to provide a novel ganged trolling device adapted to support a single lure having a plate body supporting two pivot arms in turn supporting a number of flashers, thereby simulating a small school of fish.

A further advantage of the present invention to provide a novel ganged trolling device adapted to support a single lure where each of the ganged flashers is better able to simulate a small fish, in part because the flashers do not support a hook or lure, and are therefore better able to move in a realistic manner.

A still further advantage of the present invention is to provide a novel ganged trolling device adapted to support a single lure having an attachment point on a plate body suitable for attachment of a line carrying a single lure or fish hook.

DRAWINGS

These and other features, aspects, and advantages of the present invention will become better understood with regard to the following description, appended claims, and accompanying drawings where:

FIG. 2 is an enlarged side view of the plate body, showing the center bolt and left and right arm stops.

FIG. 3 is a sectional side view of the plate body, showing the internally threaded stand off.

DESCRIPTION

Figure 1:
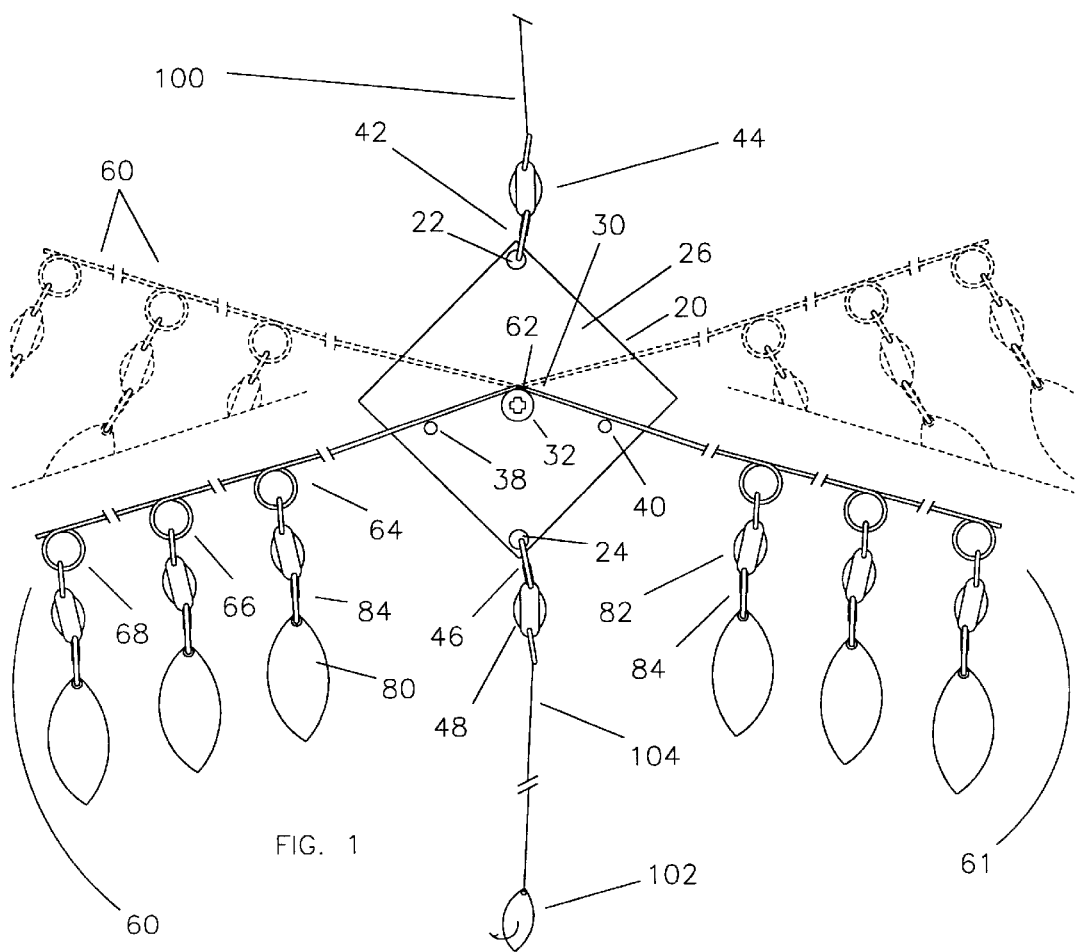
FIG. 1 is a orthographic plan view of a version of the ganged trolling device adapted to support a single lure of the invention.

Referring generally to FIGS. 1 and 2, a ganged trolling device having a single lure constructed in accordance with the principles of the invention is seen. A plate body 20 is attached at a forward hole 22 to a trolling line and at a rearward hole 24 to a fishing line supporting a single lure or hook 102. A center bolt 32 and two arm stops 38, 40 support left and right pivot arms 60, 61. A number of flashers 80 are supported by the pivot arms, thereby giving the impression of a small school of fish. A single lure or hook, trailing from the plate body, in a position somewhat behind the flashers, gives the impression of a weaker fish, unable to keep up.

Referring in particular to FIG. 1 of the drawings, a plate body 20 is typically constructed of a square piece of aluminum sheet, ⅛" thick and 1.5" by 1.5" in area. The plate body defines a forward hole 22, which allows attachment of a forward clip 42 and forward swivel 44, which allows attachment of the plate body to a fishing line 100 attached to the reel of a fishing pole (not shown). Similarly, the plate body defines a rearward hole 24, which allows attachment of a rearward clip 46 and rearward swivel 48, which allows attachment of the plate body to a lure line 104 and lure 102 or fish hook The plate body 20 is generally planar, having opposed top and bottom faces 26, 28. A stand-off 36 is forced or stamped into a hole drilled in the plate body of a central portion 30 of the top face 26. As shown in FIG. 3, the stand-off is internally threaded, thereby allowing installation of a center bolt 32. In a typical application, the threading is sized to accept a #4-440×¼ Truss head/Phillips machine screw. In the preferred embodiment, the center bolt is threaded in place and glued with Lock-Tite® or similar glue, to prevent vibration from loosening the threaded connection. The head portion 34 of the center bolt is carried approximately ⅛" above the top face 26 by a stand-off 36, allowing clearance for the pivot arms to move.

Left and right arm stops 38, 40, are carried by the plate body 20 on either side of the center bolt 32. The arm stops tend to restrict movement of the pivot arms 60, 61. In a preferred embodiment, the arm stops are made of aluminum studs PEM® or similar self-clinching fastener, which are friction fit or otherwise fastened in place.

Left and right pivot arms 60, 61, are made of heavy wire or light gauge rod. A pivot loop 62, at one end of each pivot arm, wraps about the stand-off 36 in a manner that allows free rotation within the area between the left and right arm stops 38, 40. A nylon washer (not shown) may be used to give the desired tolerance between the left and right pivot arms, the stand-off and the center bolt.

The pivot arms additionally provide a first, second and in some cases third, flasher attachment loops 64, 66, 68, to which flashers 80 or similar fish-attracting devices may be attached.

In the preferred embodiment, 4 to 6 flashers 80 are attached to the flasher attachment loops 64, 66, 68 of the left and right pivot arms by means of a standard swivel 82 and clip 84 or similar fastening means. When assembled on the pivot arms, the flashers simulate the appearance of a small school of fish.

To use a preferred version of the ganged trolling device adapted to support a single lure of the invention, the fishing line 100 from the fishing pole is fastened to the forward clip 42 and swivel 44. The lure line 104 carrying a lure 102 is then attached to the rearward clip 46 and rearward swivel 48. In most applications, the length of the the lure line 104 is between 18" and 24".

The ganged trolling device is then pulled along behind a boat or on a deep line or down rigger as is done in conventional gang troll fishing.

The previously described versions of the present invention have many advantages, including a primary advantage of providing a novel ganged trolling device adapted to support a single lure having a plate body supporting two pivot arms in turn supporting a number of flashers, thereby simulating a small school of fish.

A further advantage of the present invention to provide a novel ganged trolling device adapted to support a single lure where each of the ganged flashers is better able to simulate a small fish, in part because the flashers do not support a hook or lure, and are therefore better able to move in a realistic manner.

A still further advantage of the present invention is to provide a novel ganged trolling device adapted to support a single lure having an attachment point on a plate body suitable for attachment of a line carrying a single lure or fish hook.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while the pivot arms of the preferred embodiment of the invention define either two or three flasher attachment loops, it is clear that an alternative number of flasher attachment loops could be defined by the pivot arms while still in keeping with the teachings of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A ganged trolling device adapted to connect to a fishing line and to support a single lure, the ganged trolling device comprising:

(A) a plate body, defining a forward fishing line attachment hole and a rearward fishing lure attachment hole, the plate body comprising:
      (a) an internally threaded stand-off, carried by a central portion of a top face of the plate body, carrying a center bolt threaded into the stand-off; and
      (b) left and right arm stops, carried by the top face of the plate body on either side of the center bolt;

(B) a left pivot arm, having a pivot loop pivotably carried by the stand-off and center bolt between the plate body and a head portion of the center bolt for free rotation within an area defined between the left and right arm stops, the left pivot arm defining at least one flasher loop; and (C) a right arm pivot, having a pivot loop pivotably carried by the the stand-off and center bolt between the plate body and the head portion of the center bolt for free rotation within an area defined between the left and right arm stops, the right pivot arm defining at least one flasher loop.

2. The ganged trolling device of claim 1, further comprising a flasher, attached to each of the at least one flasher loop of the left pivot arm and attached to each of the at least one flasher loop of the right pivot arm.

3. A ganged trolling device adapted to connect to a fishing line and to support a single lure, the ganged trolling device comprising:

(A) a plate body, defining a forward fishing line attachment hole and a rearward fishing lure attachment hole, the plate body comprising:
      (a) an internally threaded stand-off, carried by a central portion of a top face of the plate body, carrying a center bolt threaded into the stand-off;
      (b) left and right arm stops, carried by the top face of the plate body on either side of the center bolt;
      (c) a forward clip, carried by the forward hole, carrying a forward swivel; and
      (d) a rearward clip, carried by the rearward hole, carrying a rearward swivel;

(B) a left pivot arm, having a pivot loop pivotably carried by the stand-off and center bolt between the plate body and a head portion of the center bolt for free rotation within an area defined between the left and right arm stops the left pivot arm defining at least one flasher loop;

(C) a right pivot arm, having a pivot loop pivotably carried by the the stand-off and center bolt between the plate body and the head portion of the center bolt for free rotation within an area defined between the left and right arm stops, the right pivot arm defining at least one flasher loop; and (D) a flasher, attached to each of the at least one flasher loop of the left pivot arm and attached to each of the at least one flasher loop of the right pivot arm.

* * * * *